UNITED STATES PATENT OFFICE.

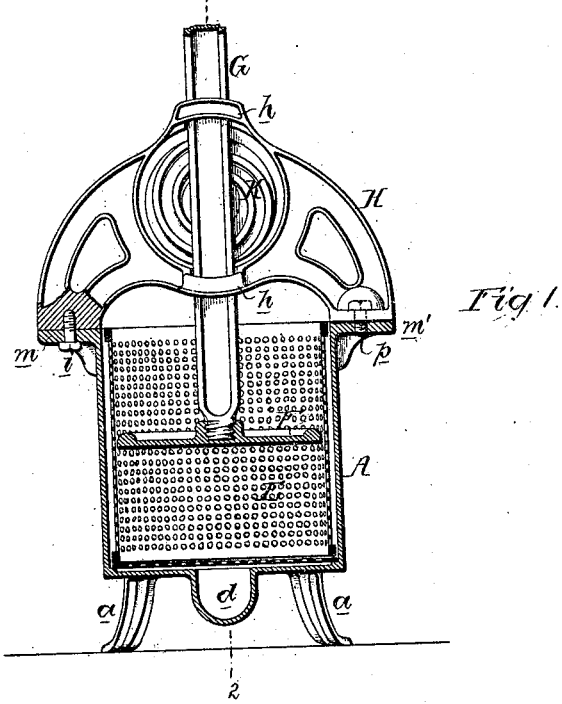
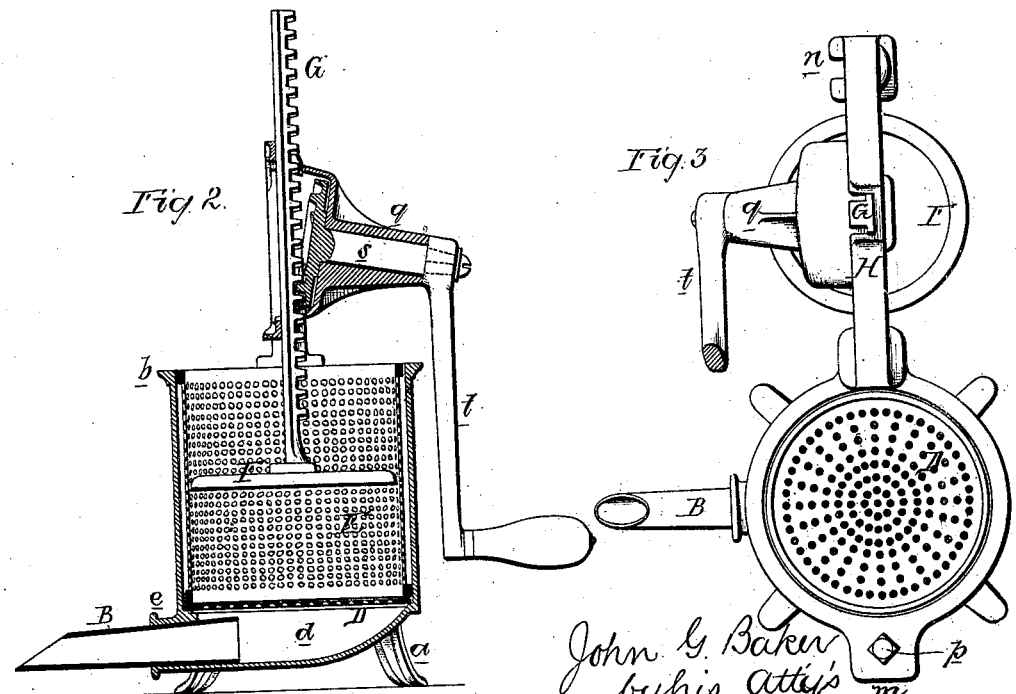

JOHN G. BAKER, OF PHILADELPHIA, PENNSYLVANIA, ASSIGNOR TO ENTERPRISE MANUFACTURING COMPANY, OF SAME PLACE.

IMPROVEMENT IN LARD-PRESSES AND SAUSAGE-STUFFERS.

Specification forming part of Letters Patent No. 179,757, dated July 11, 1876; application filed June 3, 1876.

*To all whom it may concern:*

Be it known that I, JOHN G. BAKER, of Philadelphia, Pennsylvania, have invented certain Improvements in Combined Lard-Presses and Sausage-Stuffers, of which the following is a specification:

My invention relates to improvements in machines which can be used either for pressing lard or stuffing sausages; and the main object of my invention is to construct a machine of this class in such a manner that the pressing mechanism can be readily turned to one side, thereby permitting the replenishing of the vessel in which the lard or sausage-meat has to be pressed, and as readily turned back and locked to the vessel preparatory to the operation of the pressing mechanism.

In the accompanying drawing, Figure 1 is a vertical section of the combined lard-press and sausage-stuffer; Fig. 2, a transverse vertical section on the line 1 2; and Fig. 3, a plan view.

A is a cast-iron vessel, provided with suitable legs $a$, and strengthened at the top by a flange, $b$. At the bottom of the vessel, in the center of the same, is a recess, $d$, communicating with a tubular projection or spout, $e$, into which a supplementary tapering spout, B, can be fitted for a purpose explained hereafter, the said recess $d$ being such as to permit the introduction of this supplementary spout into its place from the interior of the vessel. A perforated plate, D, by preference of cast-iron, is supported in the vessel A at a short distance from the bottom of the same, and on this plate rests the lower edge of a perforated casing, E, between which and the inside of the vessel there is an annular space communicating with the space beneath the perforated plate D, the latter as well as the perforated casing being detachable from the vessel.

To the interior of the perforated casing is adapted a disk or piston, F, attached to the lower end of the rack G, which is arranged to slide in guides $h\,h$ on the frames H the latter being hinged at one end by a pin, $i$, to a lug, $m$, on one side of the vessel, and having on the opposite end a slotted flange, $n$, adapted to a permanent stud, $p$, on a lug, $m'$, on the opposite side of the vessel.

From the rear of the frame H projects an inclined bearing, $q$, for the inclined spindle $s$, on one end of which is the inclined scroll-wheel K, the spiral rib of which is adapted to the teeth of the rack G, the other end of the shaft being provided with a suitable handle, $t$.

When the machine is used for pressing lard, the perforated casing and perforated plate must be in the vessel, as shown, but the supplementary spout B may be absent. The handle $t$ is first turned until the piston F is above the top of the vessel, when the frame H is at liberty to be swung round, as shown in Fig. 3, thereby exposing the interior of the casing, within which may be placed a supply of lard. After this the frame, with its piston and other adjuncts, is swung back, and the slotted flange $n$ of the frame passes beneath the head of the stud $p$, so that the frame becomes so locked to the vessel that it cannot move vertically independently of the same. By operating the handle $t$ the piston is now depressed, and, as soon as soon as it enters the perforated casing, the frame must be locked laterally, and hence must be in a condition to resist all the strains which may be imparted to it. On further depressing the piston, the oil will be forced from the lard, and will pass through the perforations of the casing and plate and through the spout $e$ into any suitable receptacle. After the supply of lard has been sufficiently compressed, the piston is elevated, and, when above the top of the vessel, is swung round from the same with the frame, so as to permit the removal of the pressed lard and the introduction of another supply of the crude lard into the said vessel, when the frame may be swung back and locked to the vessel preparatory to a repetition of the above-described operations.

When the machine has to be used as a sausage-stuffer, the supplementary spout B is introduced into its place, as shown in Fig. 2, the perforated plate D and perforated casing E are removed from the vessel A, and the piston F is detached from the rack G to make way for a piston of a diameter adapted to that of the interior of the vessel. The operation of the machine thus altered will be readily understood without explanation.

I do not desire to claim, broadly, a frame carrying the operating devices which can be turned to one side of the lard-receptacle; but

I claim as my invention—

1. The combination of the vessel A of a lard-press or sausage-stuffing machine with a frame carrying the piston F and mechanism for operating the same, the said frame being hinged at one end to one side of the vessel, and having a slotted flange at the other end adapted to a stud, $p$, on the opposite side of the vessel, all substantially as set forth.

2. The combination of the frame H, having an inclined bearing, $q$, for the spindle $s$ with the guided rack and piston, and with the said spindle, its scroll K, and handle $t$, all substantially as described.

In testimony whereof I have signed my name to this specification in the presence of two subscribing witnesses.

JOHN G. BAKER.

Witnesses:
HARRY SMITH,
HARRY HOWSON, Jr.